United States Patent
Sun

(10) Patent No.: US 7,612,663 B2
(45) Date of Patent: Nov. 3, 2009

(54) POWER SAVING DEVICE FOR GPS DEVICE

(75) Inventor: Chun-I Sun, Taipei Hsien (TW)

(73) Assignee: Kinpo Electrnics, Inc., Shenkeng Shiarg (TW)

( * ) Notice: Subject to any disclaimer, the term of this patent is extended or adjusted under 35 U.S.C. 154(b) by 314 days.

(21) Appl. No.: 11/641,836

(22) Filed: Dec. 20, 2006

(65) Prior Publication Data

US 2007/0146129 A1    Jun. 28, 2007

(30) Foreign Application Priority Data

Dec. 23, 2005    (TW) .............................. 94146273 A

(51) Int. Cl.
*G08B 1/08*  (2006.01)

(52) U.S. Cl. .............................. 340/539.3; 340/539.21; 455/456.1; 455/572; 342/357.01; 342/457

(58) Field of Classification Search .............. 340/539.3, 340/539.13, 539.21; 455/572, 574, 422.1, 455/456.1, 517, 522, 12.1, 13.4, 343.1; 342/357.01, 342/357.06, 352, 450, 457
See application file for complete search history.

(56) References Cited

U.S. PATENT DOCUMENTS

| | | | | |
|---|---|---|---|---|
| 6,014,080 | A * | 1/2000 | Layson, Jr. ................ | 340/573.1 |
| 6,774,838 | B2 * | 8/2004 | Sun ......................... | 342/357.06 |
| 6,985,811 | B2 * | 1/2006 | Gronemeyer ................ | 701/213 |
| 7,190,307 | B2 * | 3/2007 | Gronemeyer ........... | 342/357.15 |
| 2007/0273582 | A1 * | 11/2007 | Klinghult et al. ........ | 342/357.06 |

* cited by examiner

*Primary Examiner*—Benjamin C Lee
*Assistant Examiner*—Daniel Previl

(57) ABSTRACT

A power saving device for a GPS device is to utilize acceleration of gravity sensor to continue detecting the acceleration variation of the GPS device; if an acceleration value is larger than a threshold value, a GPS signal receiver is then started; if the acceleration value is smaller than the threshold value, the GPS signal receiver is then shut. This allows the GPS device to be power saving and not need to facilitate an extra oscillation switch therein to save the production cost.

6 Claims, 1 Drawing Sheet

US 7,612,663 B2

POWER SAVING DEVICE FOR GPS DEVICE

BACKGROUND OF THE INVENTION

1. Field of the Invention

The present invention relates to a GPS device, and more particularly to a power saving device for a GPS device.

2. Description of Related Art

The upgrading of the manufacturing technology and the functions of an electronic product enable the use of a GPS device to be more popular. There are many types of the GPS device such as a portable GPS device convenient for being used in an individual's mountain climbing and travel, GPS device combined with a cellular phone and GPS device combined with a vehicle allowing a user to realize his position and the direction of the destination that he wants to go if it is operated in coordination with an electronic map.

All general portable GPS devices use a battery to provide electricity. When a GPS receiver is in a normal operation, it is very power consuming. If the GPS device is not moved, it can enter a rather power consuming mode, the power can then be saved so that the use life of the battery can be extended.

U.S. Pat. No. 6,774,838 discloses a power saving device and method for a GPS receiver, in which the power saving device allows the GPS receiver to be connected to an oscillation switch and the vibration generated from the moving of the GPS receiver can be utilized to actuate the oscillation switch to turn on the power of the GPS receiver automatically with a power controller. The oscillation switch enables the power controller to turn off the power of the GPS receiver automatically when the GPS receiver is not moved so that the power can be saved.

An acceleration of gravity sensor (G-sensor) is installed in a several GPS devices. The G-sensor detects the variation of gravity to measure the acceleration generated from the movement of a body and output a simulated voltage signal. This can provide the data of the acceleration of the body so as to assist the GPS receiver to provide the data of the velocity and the position of the body even in such as a time period that the satellite signals cannot be received or well received when it is in tunnel or is blocked by mountains, trees, buildings and etc. When the G-sensor is under a work voltage of 3.3 volts, the power consumption thereof is 1 mA; this is far less than the one needed for the GPS receiver.

SUMMARY OF THE INVENTION

For improving a conventional power saving device for a GPS device to allow the production cost to be more saved, the present invention is proposed.

The main object of the present invention is to provide a power saving device for a GPS device, enabling the GPS device to have a function of power saving.

Another object of the present invention is to provide a power saving device for a GPS device, utilizing a G-sensor installed therein and needing no extra oscillation switch so as to save the production cost.

BRIEF DESCRIPTION OF THE DRAWINGS

The present invention can be more fully understood by reference to the following description and accompanying drawings, in which.

DETAILED DESCRIPTION OF THE INVENTION

Figure 1:
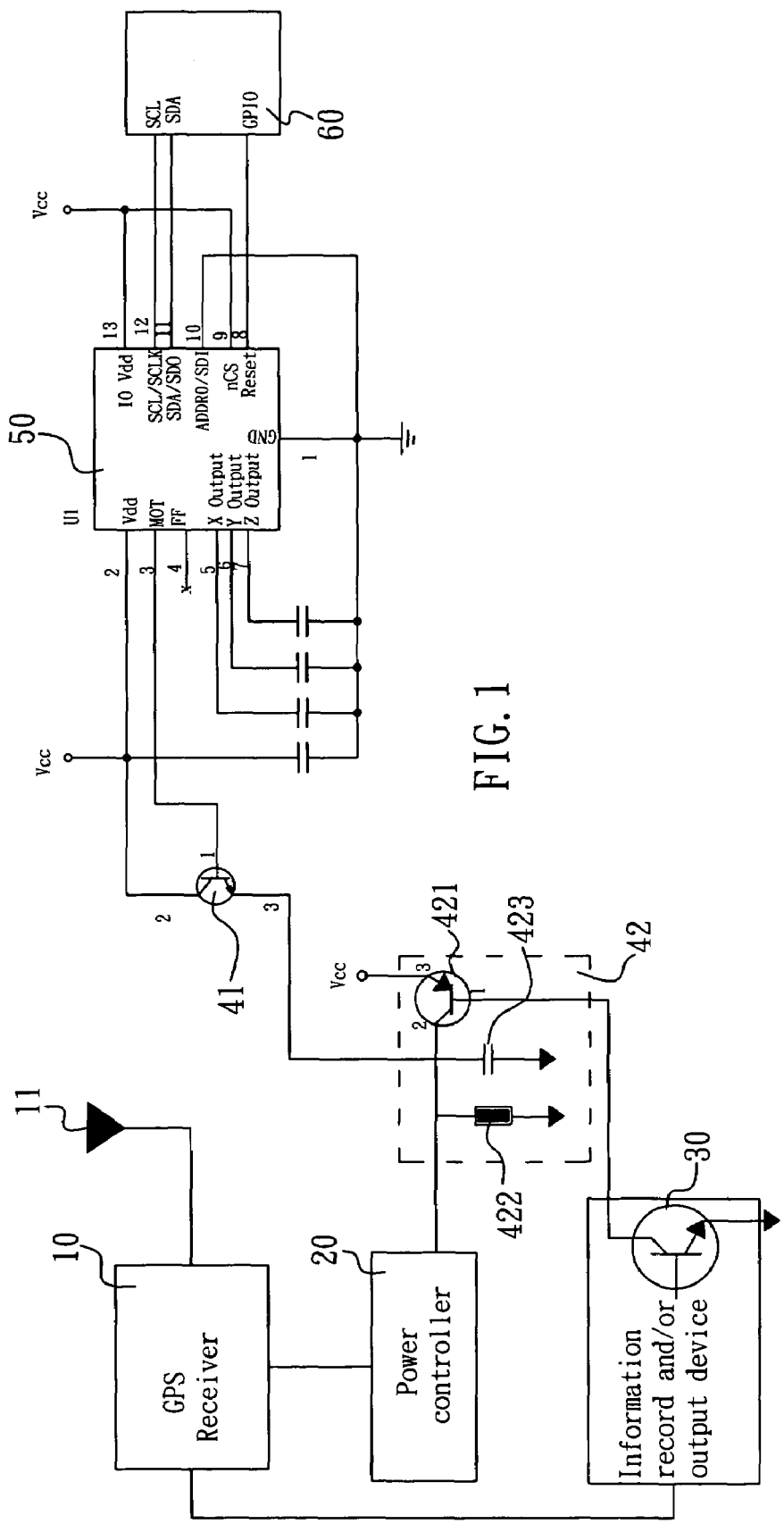
FIG. 1 is a block diagram of a power saving device for a GPS device of a preferred embodiment according to the present invention.

Please refer to FIG. 1. FIG. 1 is a power saving device for a GPS device of a preferred embodiment according to the present invention. The power saving device comprises a GPS receiver 10 electrically connected to a GPS antenna 11, a power controller 20 and an information record and/or output device 30, in which a time delay controller 42 is respectively electrically connected to the power controller 20, the information record and/or output device 30 and the emitter (second pole) of a first transistor 41. The time delay controller 42 comprises a second transistor 421, a resistor 422 and a capacitor 423. The emitter (third pole) of the second transistor 421 is connected to the power source. The collector (second pole) is electrically connected to the power controller 20. One end of the resistor 422 and one end of the capacitor 423 are grounded, other ends thereof are respectively electrically connected to the collector of the second transistor 421. The information record and/or output device 30 are connected to the base of the second transistor 421. The collector (second pole) of the first transistor 41 is electrically connected to the power source and the base (first pole) thereof is electrically connected to the MOT pin of a G-sensor 50. The G-sensor 50 is communicated with a microprocessor 60 through a transmission interface (SCL, SDA). The microprocessor 60 can set a threshold value triggered by the MOT pin of the G-sensor 50 through this transmission interface.

When the power controller 20 detects that the capacitor 423 is charged to have a higher potential, it then starts the GPS receiver 10; when the power controller 20 detects that the capacitor 423 has a lower potential, it then closes the GPS receiver 10.

The capacitor 423 has a higher potential at two following conditions:

(a) When the G-sensor 50 detects that the acceleration value of its movement is beyond the threshold value, it converts the MOT pin to be at a high potential to output a starting signal to allow the first transistor 41 to be communicated, the power is delivered to the power controller 20 and to the capacitor 423 too to cause the capacitor 423 to be charged. Or (b) When the information record and/or output device 30 is forced to output a low potential, the emitter and the collector of the second transistor 421 are communicated with each other to cause the collector thereof to be at a high potential and the capacitor 423 to be charged. Besides, it also causes the power controller 20 to receive a high potential signal.

The capacitor 423 has a lower potential at two following conditions:

(a) when the G-sensor 50 detects that the acceleration value of its movement is below the threshold value, it converts the MOT pin to be at a low potential and then stop outputting a starting signal to cause the first transistor 41 not to be communicated; no power is delivered to the capacitor 423 to cause the capacitor 423 not to be charged. And (b) when the information record and/or output device 30 is not forced to output a low potential to cause the emitter and the collector of the second transistor 421 not to be communicated, the collector thereof does not charge the capacitor 423;

the capacitor 423 is at a low potential by means of the gradual discharge of the resistor 422.

Selecting different resistor 422 and capacitor 423 can adjust the discharge rate of the capacitor 423, further control the time that the capacitor 423 is converted to be at a low potential so as to delay the time that the power controller 20 detects that the capacitor 423 has a lower potential to extend the outputting of the signal controlling the GPS receiver 10 from the power controller 20 and further to extend the action time of the GPS receiver 10.

The information record and/or output device 30 according to the present invention has a CPU, capable of processing and operating a position signal transmitted from the GPS receiver 10, and storing or outputting the processed and operated position signal. After the recording and/or outputting device 30 finishes the data recording and/or outputting action, it can then stop outputting the forced low potential to cause the emitter and the collector of the second transistor 421 not to be communicated.

The G-sensor 50 according to the present invention can be an acceleration of gravity sensing chip of serial No. KX984. The microprocessor can be a general microprocessor, such as serial No. 80C51. When the GPS device stops moving, it then enter a power saving mode after a time period; only the G-sensor 50 is left for continuing maintaining power supply and detecting the variation of the acceleration of the GPS device. If the acceleration value is beyond the threshold value, it then starts the GPS receiver.

The present invention causes the more power consuming GPS receiver to be automatically turned on and off and only causes the more power saving G-sensor to maintain supplying power to process the detection when the GPS device is stopped, this can greatly save the power. Furthermore, the present invention only utilizes the G-sensor installed in the GPS device to be an element detecting whether the GPS device starts moving or not, other extra oscillation switches need not to be installed, this can rather save the production cost.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A power saving device for a GPS device comprising:
    a microprocessor;
    an acceleration of gravity sensor (G-sensor) electrically connected to said microprocessor;
    a first transistor electrically connecting with said G-sensor;
    a time delay controller electrically connecting with said first transistor for communicating with said G-sensor and further comprising a second transistor, a capacitor and a resistor;
    a power controller electrically connected to said time delay controller and said first transistor for communicating with said G-sensor;
    a GPS receiver electrically connecting with said power controller; and
    an information record and/or an output device electrically connecting with said time delay controller and said GPS receiver;
        wherein said microprocessor offers said G-sensor a threshold value via a transmission interface of said microprocessor; said G-sensor creates an acceleration value based on a state of movement thereof, detects if said acceleration value is beyond said threshold value, outputs a starting signal to said power controller via said first transistor when said acceleration value is beyond said threshold value, and stops outputting said starting signal when said acceleration value is below said threshold value such that said power controller is capable of receiving said starting signal and starting said GPS receiver with respect to said state of the movement automatically for controlling said power source and saving a power consumption.

2. The power saving device according to claim 1, wherein said G-sensor is electrically connected to the base of said first transistor, said power controller is electrically connected to the emitter of said first transistor, and a power source is electrically connected to the collector of said first transistor such that said starting signal with a power source signal from said power source is transmitted to said power controller.

3. The power saving device according to claim 2, wherein said time delay controller extends a time duration before said starting signal capable of reaching said power controller, extends a time duration before said power controller capable of outputting a control signal to said GPS receiver, and further extends a time duration before said GPS receiver capable of performing an action.

4. The power saving device according to claim 3, wherein said resistor and said capacitor are electrically connected to said power controller and the emitter of said first transistor.

5. The power saving device according to claim 4, wherein the emitter of said first transistor is electrically connected to the collector of said second transistor, which is further electrically connected to said resistor and said capacitor.

6. The power saving device according to claim 1, wherein said time delay controller extends a time duration before said starting signal capable of reaching to said power controller, extends a time duration before said power controller capable of outputting a control signal to said GPS, and further extends a time duration before said GPS receiver capable of performing an action.

* * * * *

UNITED STATES PATENT AND TRADEMARK OFFICE
CERTIFICATE OF CORRECTION

PATENT NO. : 7,612,663 B2  Page 1 of 1
APPLICATION NO. : 11/641836
DATED : November 3, 2009
INVENTOR(S) : Chun-I Sun It is certified that error appears in the above-identified patent and that said Letters Patent is hereby corrected as shown below:

Title page, item [73] Assignee: should read as follows: KINPO ELECTRONICS, INC.

Signed and Sealed this

Fifteenth Day of June, 2010

David J. Kappos
*Director of the United States Patent and Trademark Office*